Patented May 11, 1926.

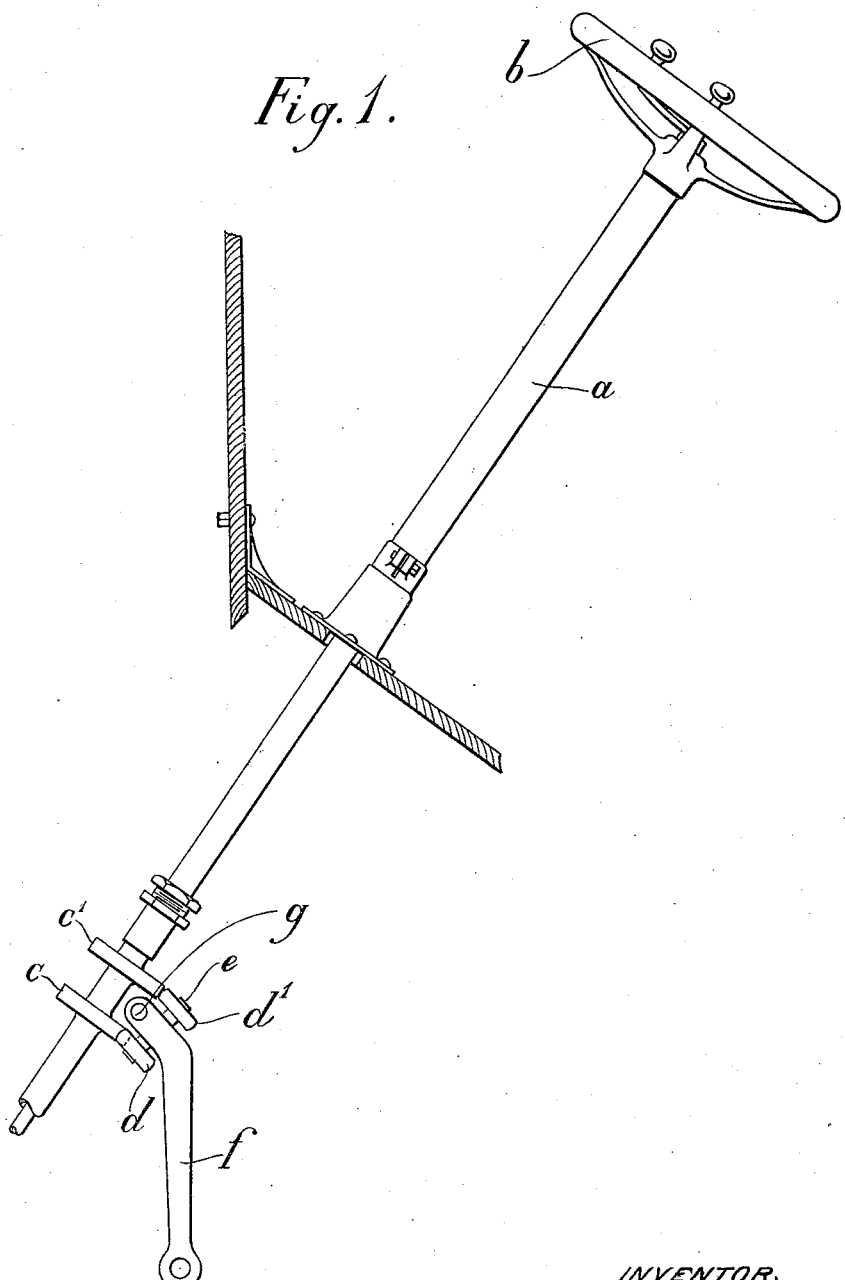

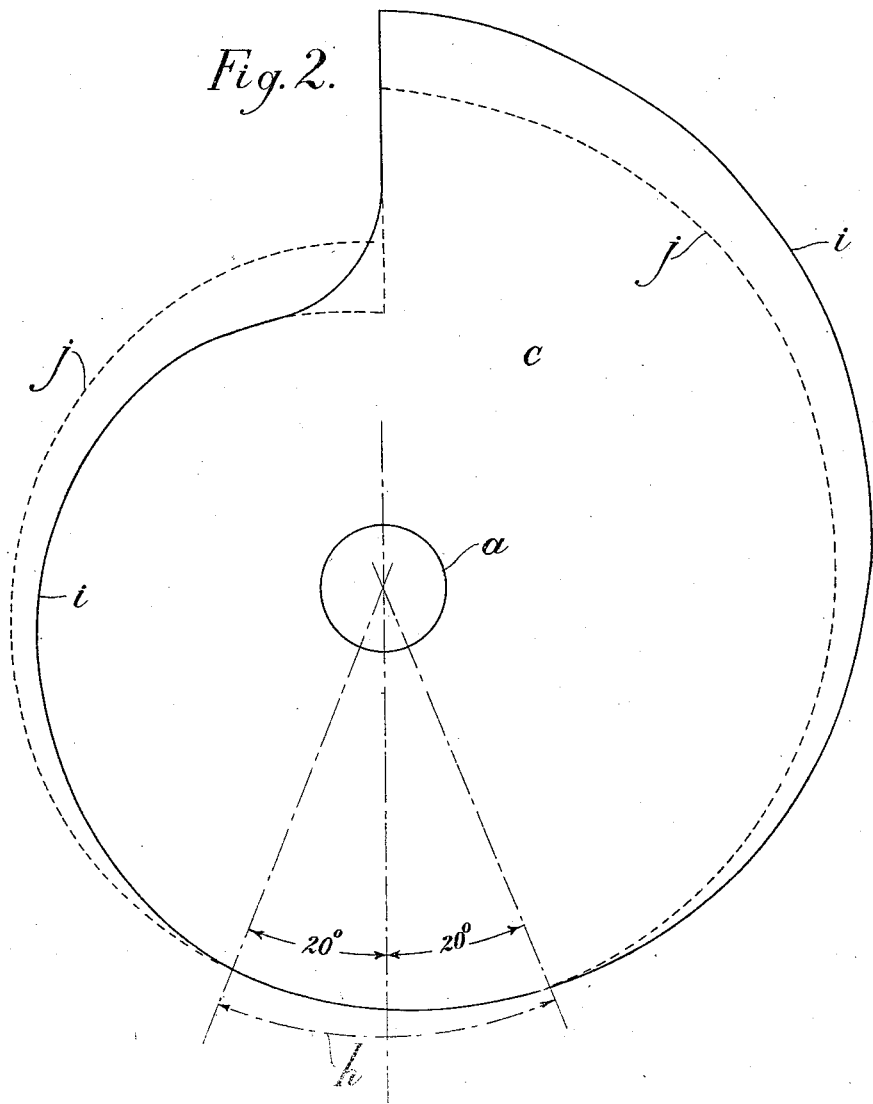

1,584,629

UNITED STATES PATENT OFFICE.

HENRY MARLES, OF LONDON, ENGLAND.

STEERING GEAR FOR MECHANICALLY-PROPELLED VEHICLES.

Application filed April 13, 1920. Serial No. 373,650.

This invention relates to improvements in steering gear for motor road and other vehicles.

The invention has more particular reference to steering gear of the kind in which a pair of opposed cams or cam surfaces are secured to or formed on, or operatively connected to the steering column so as to operate a transverse rocker shaft carrying the steering arm.

In order that the invention may be more clearly understood and readily carried into effect it is hereinafter described with reference to the accompanying drawings in which:—

Figure 1 is a diagrammatic elevation illustrating the general type of steering gear to which the present invention relates; and Figure 2 is a plan view or diagram of one of the cams showing the formation or variation in outline of the cam designed to give the desired variable ratio of movement.

As shown and referring generally to Figure 1 of the drawings the reference letter $a$ indicates the steering column and the letter $b$ the steering hand wheel. The two opposed cams $c$ $c'$ are preferably mounted on the lower end of the column $a$ and are in engagement with two rollers $d$ $d'$ carried on the ends of a pin $e$ which is mounted with the steering arm $f$ so as to oscillate with a pivot pin $g$.

The throw or rise of the cams $c$ or $c'$ is approximately determined by the difference between the maximum and minimum diameters of same, the cam faces starting from the minimum diameters and rising or receding from the centre throughout the circumference to the maximum diameter. It will be appreciated that with this opposed cam and rocker type of steering gear the total lock or movement of the front road wheels, usually about 60° or 70°, has to be effected by a steering wheel movement of something less than 360°. It has been found in practice that with cams of constant pitch the gear ratio of 4 or 5 to 1 obtainable with this type of gear is much too high for fast driving positions and so considerably above those employed on any known car as to make the steering thoroughly unsatisfactory and unsafe at high speeds. In order to overcome this disadvantage the cams of the present invention, one of which is illustrated in Figure 2 of the drawings, are of variable ratio or pitch, being conveniently cut to be equivalent to two turns of the steering wheel to full lock of the front wheels, for say 20° on each side of the straight ahead positions, thus giving a low gear in this the fast driving position. In the drawing the middle or low gear profile of the cam is denoted by the reference letter $h$ and the two terminal or side portions by the letter $i$. The dotted lines $j$ indicate the pitch which would be produced if the profile $h$ were continued, being only about half that required to move the steering road wheels through full lock.

Thus with the present invention it will be seen that the most delicate work is done by the steering mechanism when the steering road wheels are in or near the straight running position, all the faster driving being done with the steering road wheels tracking fore-and-aft. In other words the improved gearing gives a high gear for extreme locks and a very low one for the narrower locks used when travelling at high speed.

Obviously the same variable ratio effect can be obtained by other forms of cams. For instance they may be formed as helical surfaces surrounding the steering column after the manner of a screw thread with rollers in engagement therewith one above and the other below, the pitch of the thread being less at and near the middle position and steeper or more on each side of said middle position.

Having now particularly described and ascertained the nature of my said invention and in what manner the same is to be performed I declare that what I claim is:—

1. Steering mechanism for motor vehicles comprising a steering column, a steering arm, and an intermediate cam gear including two like opposed separate cams, said gear giving a variable steering ratio between the steering column and the steering arm whereby more delicate control of the steering wheel is had at and near the straight running position.

2. Steering mechanism for motor road and other vehicles comprising a steering column and hand wheel, a steering arm operatively connected to the steering road wheels, and cam gear of variable pitch between said steering column and steering arm giving a variable ratio of movement between the said steering hand wheel and the said road wheels whereby the steering is lower geared or more delicate at and near the straight running position.

3. Steering mechanism for motor road and other vehicles comprising a steering column, a pair of opposed cams having cam surfaces of variable pitch controlled thereby and a steering member operated by said cam surfaces.

4. Steering mechanism for motor road and other vehicles comprising a steering column, a pair of opposed flat cams having cam surfaces of variable pitch carried thereby and a steering member having rollers in engagement with said cam surfaces.

5. Steering mechanism for motor road and other vehicles comprising a steering column, a pair of opposed cams of variable pitch carried thereby, an oscillating steering arm carrying a pair of rollers in engagement with said cams.

6. Steering mechanism for motor road and other vehicles comprising a steering column, a pair of opposed cams of variable pitch carried thereby and projecting transversely therefrom, a steering arm mounted to oscillate in a plane at right angles to those of the cams on the steering column, and a pair of rollers on the pivot end of the steering arm so as to be in engagement with said cams.

7. Vehicle steering mechanism of the type wherein two opposed like cams connected to the steering column are employed, each cam being flat and having a cam edge of variable pitch and parallel to the axis of the steering column at all points, in combination with a steering arm mounted to oscillate in a plane at right angles to those of the cams, and a pair of rollers on the steering arm and in peripheral engagement with the cam edges.

8. Vehicle steering mechanism of the type wherein two opposed like cams are connected to and rotated by the steering column, each cam being flat and each shaped near the straight-ahead position to give a gear ratio about twice as large as the gear ratio of the remainder of the cam.

9. Vehicle steering mechanism of the character described wherein each cam is of variable pitch, each cam for a distance of substantially 20° on each side of the straight-ahead position shaped to be equivalent to two turns of the steering wheel to full lock of the front wheels, and for the remainder of its length shaped to be equivalent to slightly less than one turn of the steering wheel to full lock of the front wheels.

In testimony whereof I have hereunto signed my name.

HENRY MARLES.